(12) United States Patent
Richard et al.

(10) Patent No.: US 9,162,661 B2
(45) Date of Patent: Oct. 20, 2015

(54) VEHICLE BRAKE SYSTEM WITH AN ELECTRIC SERVOMOTOR AND HYDRAULIC REACTION PISTON

(71) Applicants: Philippe Richard, Chelles (FR);
Francois Gaffe, La Turballe (FR);
Bastien Cagnac, Cramoisy (FR)

(72) Inventors: Philippe Richard, Chelles (FR);
Francois Gaffe, La Turballe (FR);
Bastien Cagnac, Cramoisy (FR)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

(21) Appl. No.: 13/899,280

(22) Filed: May 21, 2013

(65) Prior Publication Data

US 2013/0312405 A1    Nov. 28, 2013

(30) Foreign Application Priority Data

May 23, 2012    (FR) ..................................... 12 54710

(51) Int. Cl.
*B60T 13/74*    (2006.01)
*B60T 8/40*    (2006.01)

(52) U.S. Cl.
CPC ............. *B60T 13/745* (2013.01); *B60T 8/4077* (2013.01)

(58) Field of Classification Search
CPC ..... B60T 13/745; B60T 8/4077; B60T 7/042; B60T 13/04
USPC ............................ 60/553, 539, 540, 541, 545
See application file for complete search history.

(56) References Cited

U.S. PATENT DOCUMENTS

| | | | | |
|---|---|---|---|---|
| 2009/0178404 A1* | 7/2009 | Ikeda et al. | ..................... | 60/545 |
| 2011/0314806 A1* | 12/2011 | Ishizuka | ........................ | 60/545 |

FOREIGN PATENT DOCUMENTS

| | | |
|---|---|---|
| EP | 2 000 376 | 12/2008 |
| FR | 2 860 474 | 4/2005 |
| FR | 0311580 | 4/2005 |

\* cited by examiner

*Primary Examiner* — Nathaniel Wiehe
*Assistant Examiner* — Abiy Teka
(74) *Attorney, Agent, or Firm* — Kenyon & Kenyon LLP (57) ABSTRACT

A brake system is described with a master cylinder actuated by a control rod connected to a plunger piston and an actuator piston acting directly on the primary piston. A hydraulic reaction piston is housed in the piston so it can be subjected to the pressure of the primary chamber and to the opposing action of a reaction spring. The plunger piston can push the reaction piston directly to push the master cylinder.

5 Claims, 7 Drawing Sheets

VEHICLE BRAKE SYSTEM WITH AN ELECTRIC SERVOMOTOR AND HYDRAULIC REACTION PISTON

FIELD OF THE INVENTION

The present invention relates to an electric servomotor brake system for vehicles that includes:
- a master cylinder equipped with a primary piston delimiting, in said master cylinder, a chamber connected by a brake fluid circuit to the wheel brake cylinders, and
- an electric servomotor with an actuator piston acting on the primary piston;
- a control rod connected to the brake pedal and moving a plunger piston to actuate the master cylinder, when applicable with the assistance of the electric servomotor;
- wherein the movement of the control rod is detected by a sensor that informs the control circuit of the electric servomotor;
- wherein the master cylinder, the servomotor, and the control rod are aligned on an axis.

BACKGROUND INFORMATION

Vehicle brake systems equipped with an electric servomotor are generally known, as in document French Patent No. 0311580, for example. Such a servomotor is equipped with a reaction disc whose sensitivity is difficult to adjust; in particular, the sensitivity of the reaction disc depends on the external temperature. Another disadvantage is the cost of the reaction disc.

An object of the present invention is a hydraulic-reaction brake system equipped with an electric servomotor that is independent of temperature, whose fabrication is less complex than known fabrications, and whose reliability and endurance is greater than one equipped with a reaction disc.

To that end, the object of the present invention is a vehicle brake system with an electric servomotor of the type described above, characterized in that
- the primary piston delimiting the primary chamber in the master cylinder is formed from a body
- that, on the exterior of the master cylinder, is extended by a cylindrical skirt forming an external chamber housing a reaction spring one end of which presses against a retaining organ integral with the skirt;
- that has an axial through hole connecting the rear of the external chamber and the primary chamber;
- the actuator piston cooperates directly with the skirt to push the primary piston;
- there is a hydraulic reaction piston;
- housed in the bore hole of the body of the primary piston;
- integrally bearing an axial thrust rod on the exterior;
- equipped with a stop against which the other extremity of the reaction spring rests;
- which said stop rests against the rear of the external chamber to push the primary piston or to be pushed by it.

The brake system according to the invention as described above has the advantage of especially simple fabrication and operation independent of the outside temperature with respect to pedal feel. This solution is especially reliable because it does not include a reaction disc, which is generally made of a rubbery material.

According to a particularly advantageous characteristic, the reaction spring consists of a principal spring and an auxiliary spring combined in series, separated from one another by a floating support that is mobile with respect to a primary piston stop to limit the expansion stroke of the principal spring, the auxiliary spring being of reduced hardness with respect to that of the principal spring so it can be compressed before the principal spring. The reaction spring is thus composed of an auxiliary spring with the interposition of a floating support to compensate for the drag of the brake against the brake disc, wherein this does not affect pedal feel.

According to another advantageous characteristic, the retaining organ is a disc traversed by the thrust rod, which is of particular interest if, according to another advantageous characteristic, the thrust rod has a shoulder that cooperates with the retaining organ to define an extreme end-of-travel position for the reaction piston.

According to another advantageous characteristic, the stop has a collar that cooperates with the floating support in compressing the auxiliary spring to limit the compression of the auxiliary spring and thereby press directly upon the floating support.

BRIEF DESCRIPTION OF THE DRAWINGS

FIGS. 4 to 10 schematically illustrate the different operating states of the brake system according to FIG. 2.

DETAILED DESCRIPTION

A description of the different embodiments will be provided below for the general case of a master cylinder, 100, combined with an electric servobrake, 120, wherein the master cylinder can be a simple master cylinder, that is, feeding a single brake circuit, or a tandem master cylinder feeding two brake circuits. Piston 101 of this master cylinder will be referred to as primary by convention, whether it is a single piston of a simple master cylinder or the first piston (primary piston) of a tandem master cylinder. Primary piston 101 delimits, in master cylinder 100, a chamber 102, referred to as the primary chamber for easier identification, whether this chamber is the only chamber of the simple master cylinder or, effectively, the primary chamber of the tandem master cylinder.

Figure 1:
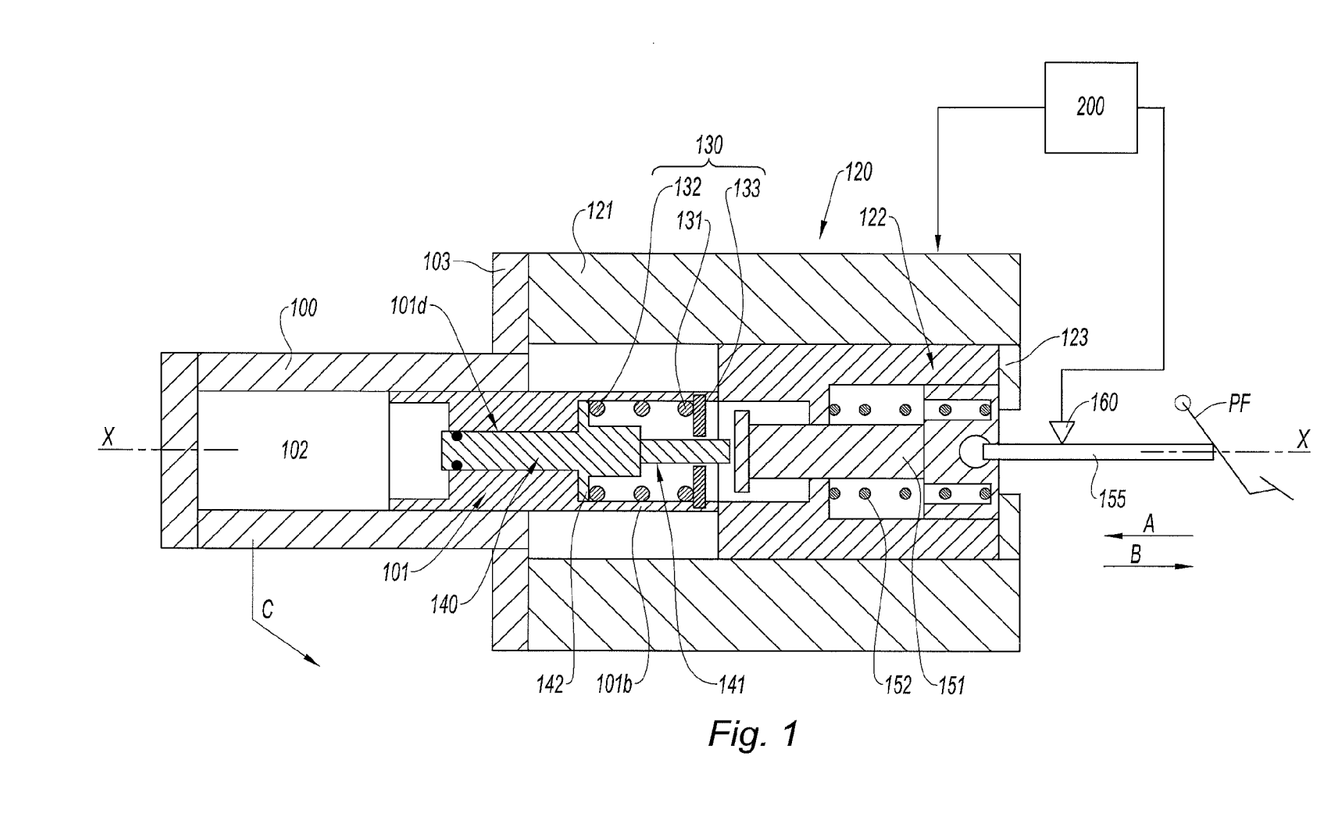
FIG. 1 is a cutaway view of a brake system composed of a master cylinder and an electric servomotor according to a first embodiment of the invention.
Figure 1A:
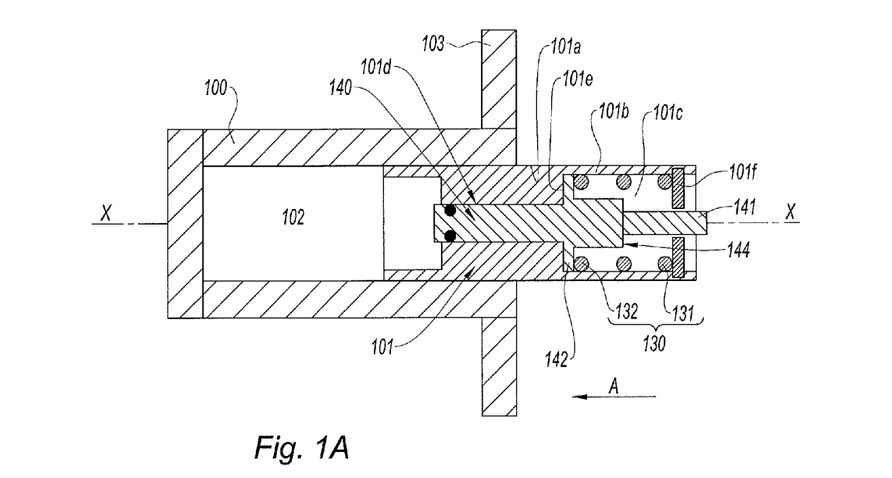
FIG. 1A is a partial view of FIG. 1 limited to the master cylinder and the hydraulic reaction piston.

According to FIGS. 1, 1A, a first embodiment of a vehicle brake system according to the invention is composed of master cylinder 100 combined with electric servomotor 120, the assembly being aligned along axis xx, on which the various moving elements of this combination move.

Piston 101 is housed in the cylinder of master cylinder 100, and therein delimits a primary chamber, 102, that supplies a brake circuit, C, connected to the wheel brakes (not shown) to supply them with hydraulic fluid under pressure. Master cylinder 100 is supplied with brake fluid from a reservoir (not shown). These different, generally known, means do not require detailed explanation.

Operation of the assembly is controlled by a control circuit, 200, that receives signals primarily for the purpose of controlling servomotor 120.

According to FIG. 1A, primary piston 101 consists of a body, 101a, constituting the piston properly speaking, delimiting primary chamber 102 on the interior of the master cylinder. On the exterior, body 101a of the primary piston is extended by a skirt, 101b, delimiting a chamber, 101c, open to the exterior and whose rear wall, 101e, is formed by the body of the primary piston. The body is traversed by an axial hole, 101d, emerging in external chamber 101c and in primary chamber 102. External chamber 101c houses a reaction spring, 130, in the shape of a helical spring that approaches the interior wall of skirt 101b. This reaction spring 130 is retained in the external chamber by stop 101f integral with skirt 101b, against which its extremity, 131, rests.

Primary piston 101 houses reaction piston 140 that slides in axial hole 101d. Reaction piston 140 is extended along the exterior by axial thrust rod 141 and has stop 142 by which reaction piston 140 can press against body 101a of primary piston 101 or, reciprocally, by which primary piston 101 can press against reaction piston 140. Stop 142 of the reaction piston receives the other extremity, 132, of reaction spring 130. Reaction spring 130, which is a helical compression spring, thus presses stop 142 of reaction piston 140 against rear wall 101e of the body of primary piston 101 in the absence of other forces exerted on reaction piston 140. The thrust rod of reaction piston 140 has a shoulder, 144, intended to limit the travel of piston 140 in direction B. Thus, reaction piston 140, pushed in direction B, cannot be pushed beyond stop 101f, which will encounter its shoulder 144.

The various seals of primary piston 101 and reaction piston 140 are not shown.

According to FIG. 1, master cylinder 100 is combined with electric servomotor 120, simply represented by its body 121, attached to flange 103 of master cylinder 100 and constituting the stator of the motor. Servomotor 120 has actuator piston 122 controlled in a manner not shown, for example, by a ball-screw type connection, as described, for example, in document FR 0311580. The mechanical method transmitting the movement that directs actuator piston 122 does not need to be described precisely here because the only significant aspect is the fact that actuator piston 122 is controlled by servomotor 120 for its displacement from right to left (arrow A) along axis xx to act upon primary piston 101 and assist in braking.

The drive connection of actuator piston 122 is a one-way or two-way connection. In the first case, the return of actuator piston 122 at the conclusion of braking is ensured by the return forces, primarily the hydraulic forces acting on actuator piston 122. In the second case, the return is ensured by reversing the direction of operation of the electric servomotor at the conclusion of braking.

Actuator piston 122 houses plunger piston 150, extended in the direction of master cylinder 100 by cylindrical extension 151 and pushed by return spring 152 against rear wall 123 of housing 121 of the servomotor, which serves as a stop, just as actuator piston 122 is applied against rear wall 123 of the body of the servomotor in the neutral position of FIG. 1. Plunger piston 150 is connected to control rod 155, itself connected to brake pedal PF. Control rod 155 is displaced by an action on the brake pedal that pushes plunger piston 150 under conditions that will be described below.

The movement of control rod 155 or plunger piston 150 is detected by motion sensor 160, which sends an actuator signal to control circuit 200, which manages the operation of electric servomotor 120, activating it and controlling the displacement of actuator piston 122.

Actuator piston 122 pushes directly on skirt 101b of primary piston 101, thereby pushing primary piston 101.

In general, during normal operation, the brake system of FIG. 1 is actuated by a force exercised on brake pedal PF, which displaces control rod 155 and plunger piston 150. The displacement of the plunger piston or the control rod is detected by sensor 160, which informs control circuit 200. This circuit actuates servomotor 120 for the braking action. Actuator piston 122 is displaced in direction A to push primary piston 101, which first delivers the fluid in brake circuit C then compresses the hydraulic fluid in primary chamber 102 and supplies hydraulic fluid under pressure to wheel brakes circuit C. This operation is the same whether the master cylinder is a simple master cylinder or a tandem master cylinder with a primary piston, a secondary piston, a primary chamber, and a secondary chamber.

During this normal braking activity, thrust rod 141 is not in contact with plunger cylinder 150, an interval between these two elements being controlled by control circuit 200 through the actuating movement of primary piston 101. During this movement, the reaction on the pedal is provided by the reaction engendered by return spring 152.

Operation of the brake system of FIGS. 1, 1A will be described in detail together with the operation of the second embodiment shown in FIGS. 2, 2A, followed by the exceptional operating conditions of this brake system.

Figure 2:
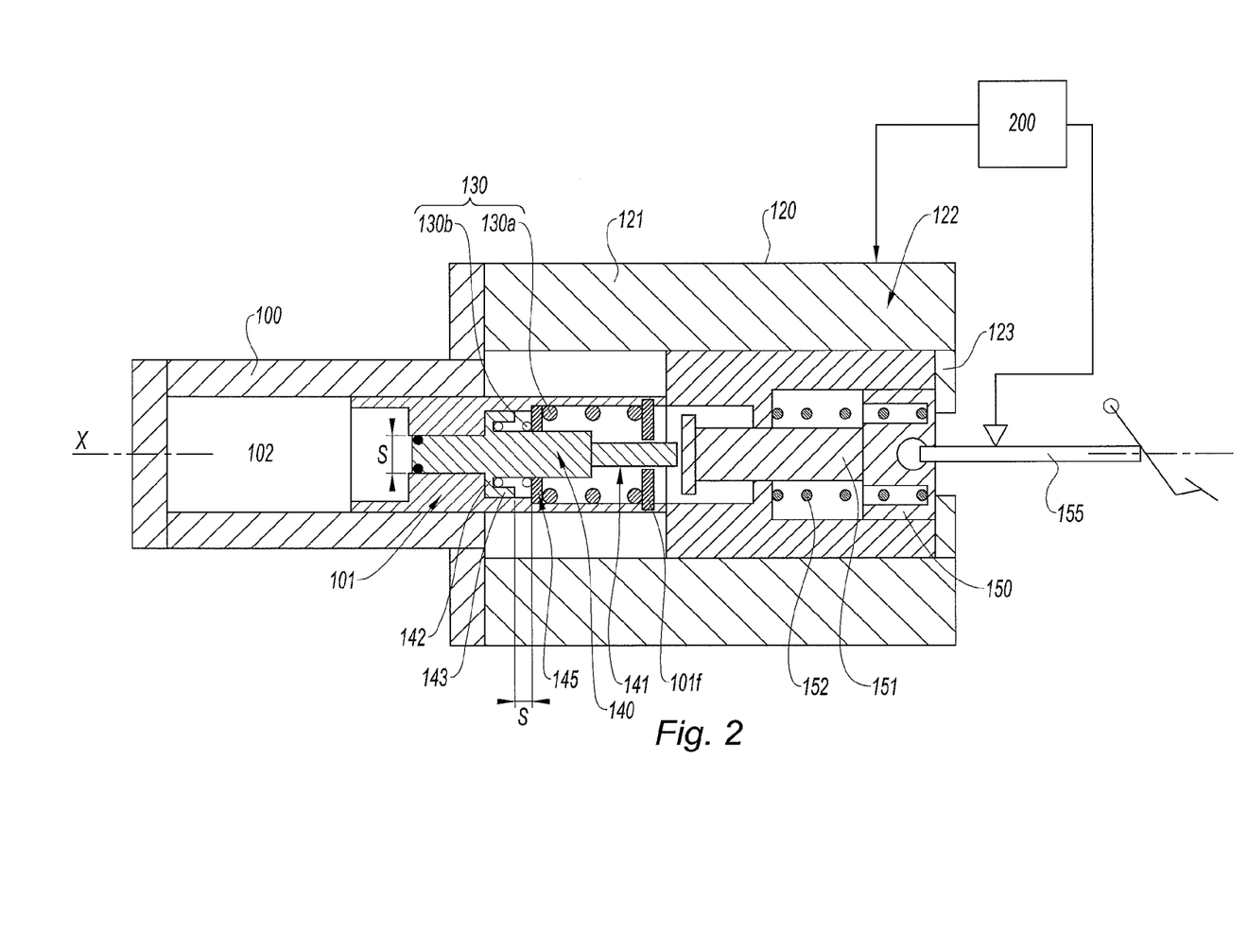
FIG. 2 is a schematic view of a second embodiment of an electric servomotor brake system according to the invention.
Figure 2A:
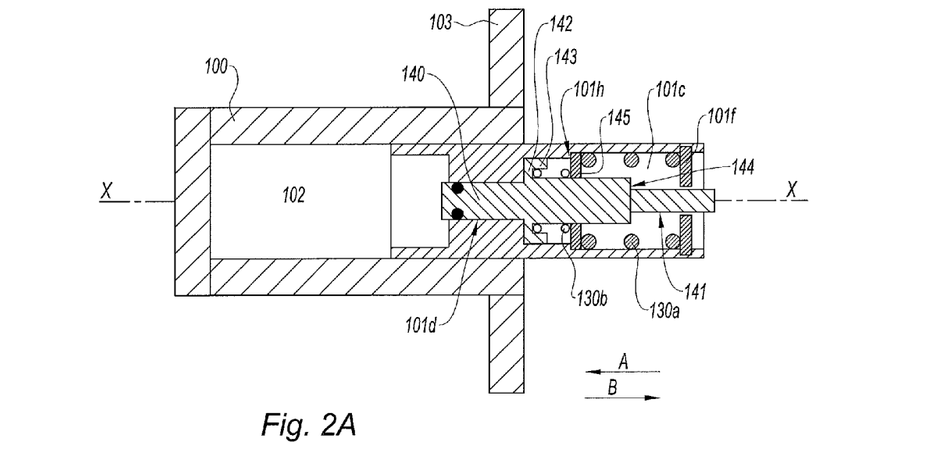
FIG. 2A is a partial view of FIG. 2 limited to the master cylinder and the reaction piston.

FIGS. 2 and 2A illustrate a second embodiment of the vehicle brake system with an electric servomotor and hydraulic reaction piston and drag compensation according to the invention, which differs from the first embodiment in that reaction spring 130 of hydraulic reaction piston 140 consists of a principal spring, 130a, and an auxiliary spring, 130b; the other elements that are identical to the first embodiment have the same reference numbers and their description will not be repeated.

Principal spring 130a is housed between retaining organ 133, integral with skirt 101b, near the exterior extremity of the skirt, and a floating support, 145, in the shape of a washer, which slides in skirt 101b and makes contact with shoulder 101h, limiting the displacement of floating support 145 in the direction of release of principal spring 130a (direction A).

Auxiliary spring 130b is installed between the back of floating support 145 and stop 142 of hydraulic reaction piston 140. Stop 142 is, in this example, equipped with a spacer ring, 143, intended to press against the back of floating support 145 to limit the compression and compaction of auxiliary spring 130b and directly transmit the thrust of reaction piston 140 to floating support 145.

Distance S, which separates the edge of ring 143 from the back of floating support 145, is the distance that reaction piston 140 can travel in compressing auxiliary spring 103b. Distance S represents the relative movement between primary piston 101 and reaction piston 140 at the start of a braking action enabling drag compensation.

Principal spring 130a and auxiliary spring 130b, constituting reaction spring 130, are combined in series, that is, they act upon one another. The hardness of auxiliary spring 130b is relatively low and its preloading is, for example, on the order of 30 N, whereas the hardness of principal spring 130a is significant. This means that if a force is exerted in direction B on hydraulic reaction piston 140, primary piston 101 being considered fixed, reaction piston 140 first compresses auxiliary spring 130b until peripheral ring 143 rests against the back of floating support 145. At that moment, auxiliary spring 130b no longer plays a role and the force is directly transmitted by stop 142 and peripheral ring 143 of reaction piston 140 to floating support 145 in such a way that, from this moment, principal spring 130a will be compressed.

Please note that, as in FIG. 1, in FIG. 2 the extremity of thrust rod 141 of hydraulic reaction piston 140 is not in contact with the forward face of plunger piston 150 when the brake system is at rest or operating normally, and no exceptional braking is taking place.

Figure 3:
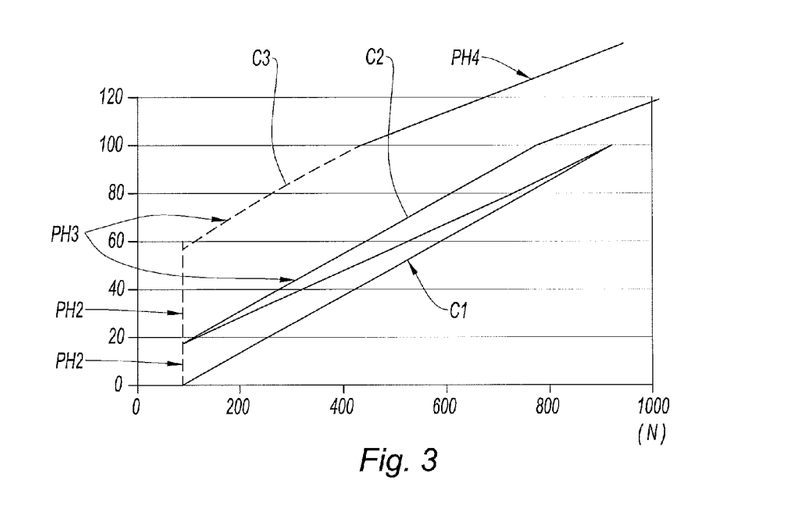
FIG. 3 is a graph that provides the force/pressure characteristic as a function of the incoming force applied to the control rod for different brake systems.

FIG. 3 is a diagram illustrating the different operating curves of a servomotor brake system.

These diagrams represent, along the abscissa, the force applied to control rod 155 through brake pedal PF. This force is represented in N units. The ordinate represents the pressure occurring in primary chamber 102 of master cylinder 100, whether it is a simple master cylinder or a tandem master cylinder. This pressure is indicated in bars.

All the curves shown have in common an initial phase, PH1 during which the force applied to control rod 155 does not result in any increased pressure in master cylinder 100. This initial phase corresponds to the compensation of play in the kinematic chain of the brake system.

At the end of this first phase, there is, under appropriate conditions, a PH2 jump, corresponding to the sudden transition from zero pressure (with respect to the outside pressure) in master cylinder 100 to a higher, even relatively high pressure.

Three cases are envisaged:
  The first case (curve C1) is that of the absence of a mechanism creating a jump in the servobrake. For example, this is represented by an embodiment such as that shown in FIG. 1. Servobrake 120 begins to act directly, based on the null pressure in the master cylinder. The pressure then increases, the right segment corresponding to the rise in pressure provided by the servobrake. The action of the servobrake is, for example, limited to a pressure of 100 bars.
  The second curve, C2, shown with a solid line, corresponds to a known servobrake. The jump pressure is relatively low, on the order of 15 to 20 bars. At the end of jump phase PH2, the pressure in the master cylinder will increase due to the action of the servomotor (phase PH3). At the end of the intervention of the servomotor (for example, at a pressure of 100 bars), the force component can be supplied only by forceful action on the brake pedal. Segment PH4, extending the right segment corresponding to phase PH3 of the intervention of the servomotor, is a steeper straight line, D4, combining two actions—that of the servomotor, which is then limited to its maximum intervention, and the progressive, forceful action exerted by the driver on brake pedal PF.
  Curve C3, a dashed line, represents the operation of the system of FIG. 2. The PH2 jump is significant and depends on the hardness of principal spring 130a. After the jump period, PH2, there is a period of intervention by the servomotor, PH3, until a customary maximum pressure is reached in the master cylinder, which is generally 100 bars. This is followed by the combined action of the intervention of the servobrake and the forceful thrust exerted on the brake pedal (phase PH4).

In the absence of a forceful thrust, that is, under normal braking conditions, the action is limited to phase PH3, intervention by the servomotor.

Operation of brake system 2, 2A will be described below in greater detail with the help of FIGS. 4 to 10, corresponding to this second embodiment; the operation of the first, simpler, embodiment can be deduced during the course of the explanation.

Figure 4:
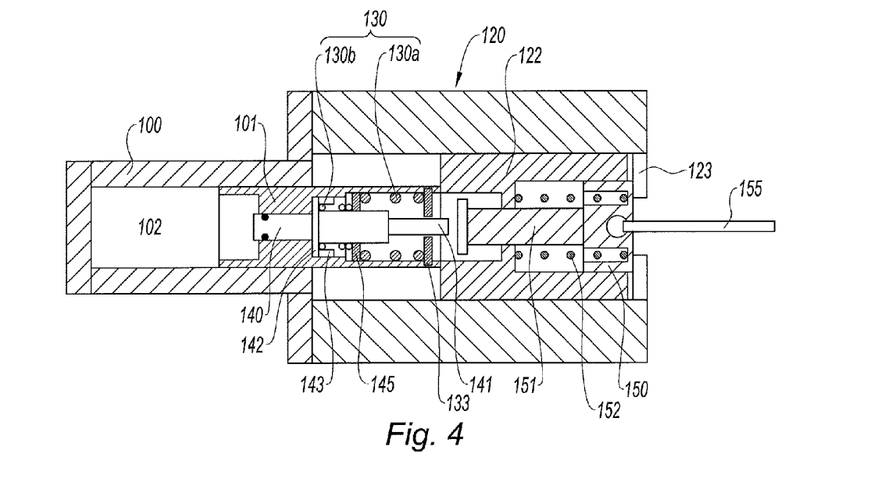
FIG. 4 illustrates a braking action at the start of the drag compensation phase.

As shown by FIG. 4, starting from the initial rest position of the different elements of the combination, control circuit 200, which detects an initial displacement of control rod 155, actuates servomotor 120 so that actuator piston 122 compensates for the play in the kinematic and hydraulic chain by pushing primary piston 101. This travel is relatively short. During this travel, plunger piston 150 remains pressed against rear wall 123 of body 121 of electric servomotor 120.

This movement has no influence on pedal travel. A certain volume of brake fluid is displaced by the movement of the actuator piston under low pressure, for example, on the order of 2 to 3 bars, and, as shown, reduces mechanical play as well as hydraulic play by pre-filling the brake cylinders. This situation and position of the elements corresponds to the onset of drag compensation.

Figure 5:
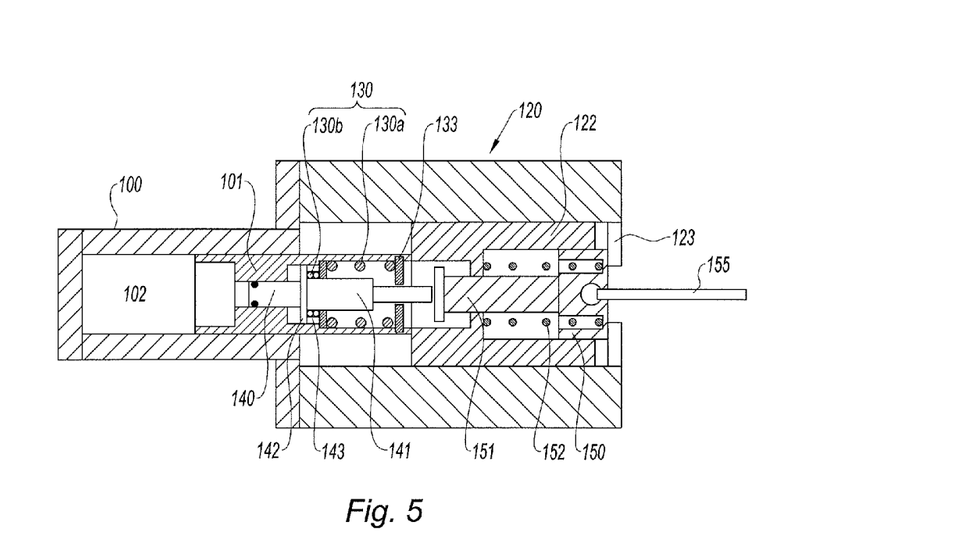
FIG. 5 illustrates the end of the drag compensation phase.

FIG. 5 shows the end of the drag compensation movement. Actuator piston 122 has repelled primary piston 102 by generating increased pressure in primary chamber 102, which has displaced reaction piston 140, exposed to the pressure in primary chamber 102, with respect to primary piston 102, in direction B. This movement compresses auxiliary spring 130b until spacer ring 143 rests against the back of floating support 145. Auxiliary spring 130b is thereby compressed to the maximum allowed by threshold S. Floating support 145 is then applied against shoulder 144 in external chamber 101c. During this phase, spring 130a is not compressed. The driver begins to press on the pedal. Because of the servo action managed by control 2, thrust rod 141 of reaction piston 140 is not in contact with the front of plunger piston 150.

Figure 6:
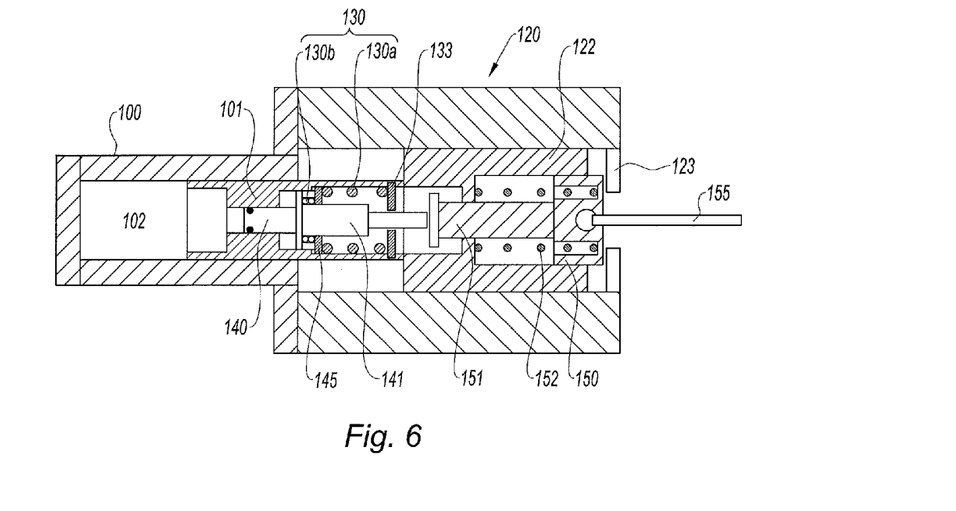
FIG. 6 illustrates the jump transition.

FIG. 6 illustrates the jump phase—the continuation of the action of servomotor 120, controlled by maintaining pressure on brake pedal PF, and the displacement of control rod 155 with plunger piston 150. This movement is detected by sensor 160. Actuator piston 122 continues its movement of pressurizing primary chamber 102 by pushing directly on primary piston 101. When pressure in primary chamber 102 is exerted on hydraulic reaction piston 140, this compresses principal spring 130a over a distance that depends on the stiffness of principal spring 130a. Spring 130a is chosen to provide the desired stiffness, that is, a given pressure level at the end of the jump (see FIG. 3).

As shown in FIG. 6, the travel of reaction piston 140 is relatively short during the jump with respect to primary piston 101. There is no contact between thrust rod 141 and plunger piston 150. Plunger piston 150 is subject to the reaction of return spring 152, which creates the pedal sensation for the control rod and the foot pressing on the brake pedal, that is, the sensation of the reaction of the brake circuit.

Figure 7:
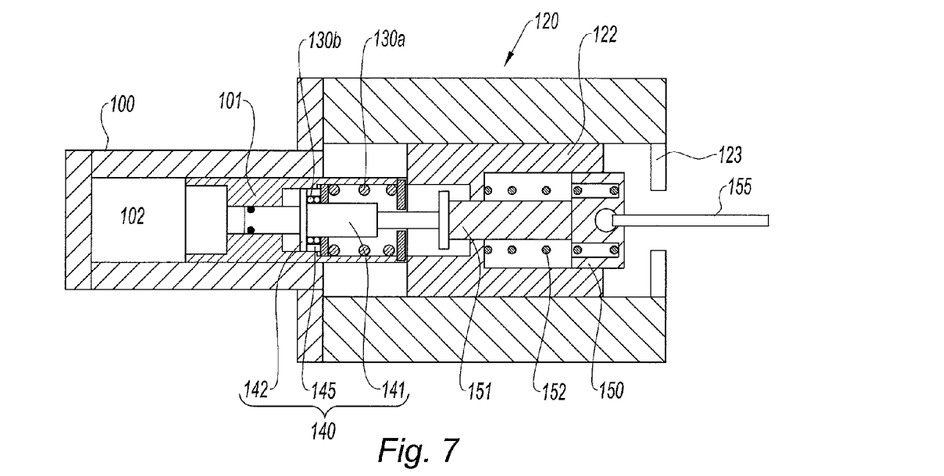
FIG. 7 illustrates the application of a violent force on the brake pedal and the control rod.

According to FIG. 7, during this action of servobrake 120, the driver exerts considerable force on pedal PF; this force is transmitted by the control rod 155 to plunger piston 150, which compresses return spring 152 and touches the extremity of axial thrust rod 141 so that this force results in compression of the fluid in primary chamber 102 through the advance of hydraulic reaction piston 140, actuator piston 122 maintaining the contact of primary piston 101. During this phase, the driver perceives, through brake pedal PF, the force composed of the reaction of return spring 152, augmented by the force of reaction piston 140 (its surface exposed to the pressure of primary chamber 102 multiplied by that pressure).

Figure 8:
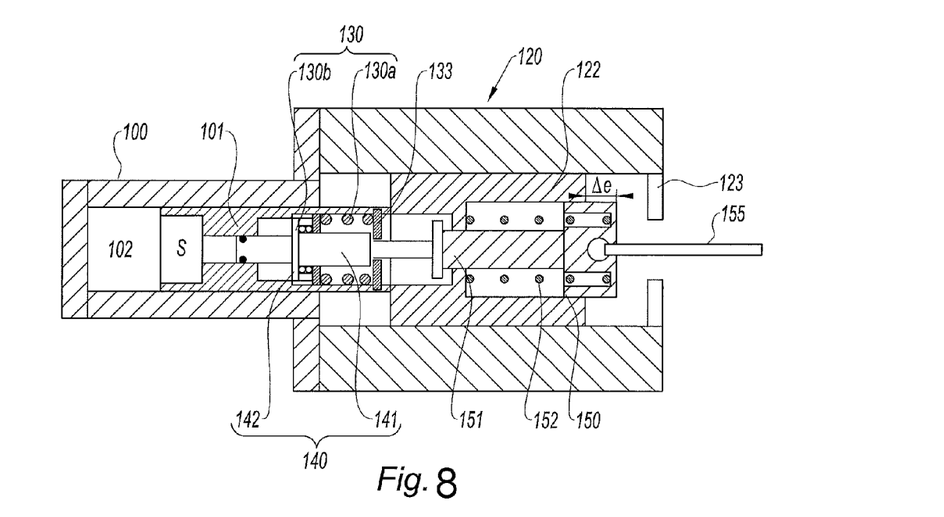
FIG. 8 illustrates the application of a moderate force on the brake pedal.

As shown in FIG. 8, if the action on brake pedal PF is moderate, actuator piston 122 causes primary piston 101 to advance, producing a force on hydraulic reaction piston 140, which compresses principal piston 130*b* somewhat more. The differential travel, Δ1, between actuator piston 122 and plunger piston 150 is controlled and used for servo action by control circuit 200. The force perceived by the driver at brake pedal PF and that of return spring 152 is augmented by the hydraulic force exerted on reaction piston 140 and decreased by the compressive force of principal spring 130*a*, which compression is supplied by actuator piston 122.

Figure 9:
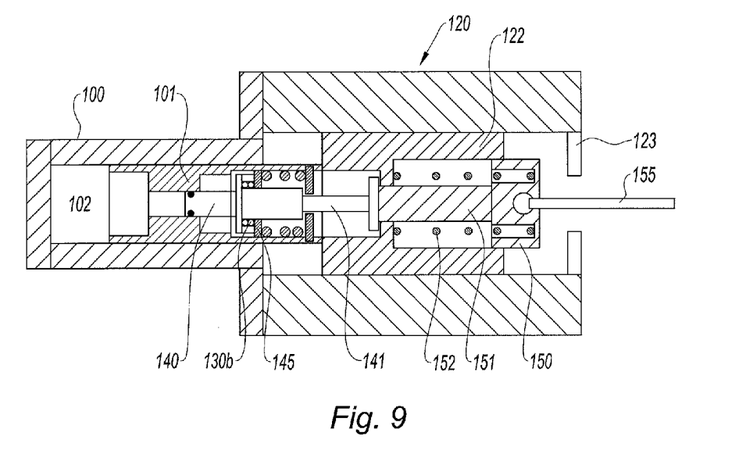
FIG. 9 illustrates the implementation of braking assistance.

FIG. 9 shows the situation of the previous figure if the driver rapidly takes his foot off the brake pedal. Because reaction piston 140 is retained in primary piston 101 and the latter is retained by actuator piston 122, there is no significant reaction that would be perceived by the driver. In effect, reaction piston 140 cannot withdraw (direction B) beyond the point where its shoulder 144 comes into contact with stop 101*f* of primary piston 101.

Figure 10:
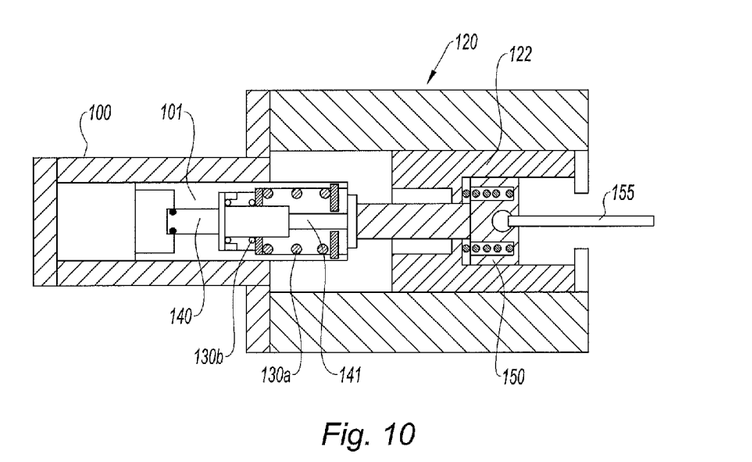
FIG. 10 illustrates emergency mode, with direct action of the brake pedal on the master cylinder.

FIG. 10 illustrates emergency operation if electric servomotor 120 fails. Control rod 155 directly transmits the force of reaction piston 140 through plunger piston 150, in direct contact with reaction piston 140. Insertion of reaction piston 140 into primary chamber 102 creates sufficient pressure in the brake circuit for this emergency operation.

For these pressure levels, principal spring 130*a* is not compressed by the differential movement between hydraulic reaction piston 140 and primary piston 101.

Operation of the brake system according to the embodiment of FIGS. 1A, 1B corresponds in practice to that described above for the brake system of FIGS. 2, 2A; the initial phase shown in FIG. 4 also applies to the first embodiment. Only the operating phase shown in FIG. 5, corresponding to drag compensation, does not exist. Subsequently, operation is the same as that shown in FIGS. 6 to 10.

The present invention applies to the vehicle brake systems industry.

What is claimed is:

1. An electric-servomotor vehicle brake system, comprising:
    a master cylinder including a primary piston delimiting therein a primary chamber connected by a brake fluid circuit to wheel brake cylinders;
    an electric servomotor including an actuator piston acting on the primary piston;
    a control rod connected to a brake pedal and displacing a plunger piston to actuate the master cylinder, when applicable with an assistance of the electric servomotor;
    a sensor for detecting a movement of the control rod and for informing a control circuit of the electric servomotor, wherein:
        the master cylinder, the servomotor, and the control rod are aligned on an axis, and
        the primary piston delimits the primary chamber in the master cylinder and is formed from a body that, on an outside of the master cylinder, is extended by a cylindrical skirt forming an external chamber;
    a reaction spring housed in the external chamber and including an end pressing against a retaining organ integral with the skirt, wherein:
        the body includes an axial through hole connecting a rear wall of the external chamber and the primary chamber, and
        the actuator piston cooperates directly with the skirt to push the primary piston; and
    a hydraulic reaction piston housed in the axial through hole of the body of the primary piston and integrally bearing an axial thrust rod on an exterior, the hydraulic reaction piston including a stop against which another end of the reaction spring rests, wherein the stop rests against the rear wall of the external chamber to one of push the primary piston and be pushed by the primary piston.

2. The vehicle brake system according to claim 1, wherein:
    the reaction spring includes a principal spring and an auxiliary spring combined in series and separated from one another by a floating support that is movable with respect to a stop of the primary piston to limit an expansion stroke of the principal spring, and
    the auxiliary spring is of a reduced hardness with respect to the principal spring so the auxiliary spring can be compressed before the principal spring.

3. The vehicle brake system according to claim 2, wherein the stop of the hydraulic reaction piston includes a ring that cooperates with the floating support in compressing the auxiliary spring to limit a compression of the auxiliary spring and thereby rest directly against the floating support.

4. The vehicle brake system according to claim 1, wherein the retainer organ is a disc traversed by the thrust rod.

5. The vehicle brake system according to claim 1, wherein the thrust rod includes a shoulder that cooperates with the retainer organ to determine an extreme end-of-travel position for the hydraulic reaction piston.

\* \* \* \* \*